W. M. BOENNING.
SHOCK ABSORBER.
APPLICATION FILED SEPT. 2, 1919.

1,381,699.

Patented June 14, 1921.

Inventor:
William M. Boenning

UNITED STATES PATENT OFFICE.

WILLIAM M. BOENNING, OF MANITOWOC, WISCONSIN.

SHOCK-ABSORBER.

1,381,699. Specification of Letters Patent. Patented June 14, 1921.

Application filed September 2, 1919. Serial No. 321,131.

*To all whom it may concern:*

Be it known that I, WILLIAM M. BOENNING, a citizen of the United States, and resident of Manitowoc, in the county of Manitowoc and State of Wisconsin, have invented certain new and useful Improvements in Shock-Absorbers; and I do hereby declare that the following is a full, clear, and exact description thereof.

My invention relates to new and useful improvements in shock absorbers, more particularly of that type adapted to interpose resistance between the body and axle of an automobile or other vehicle in conjunction with the usual vehicle springs connecting the axle and body, although my shock absorber may be associated with any two relatively movable members.

It is in general the object of my invention to simplify and otherwise improve the structure and to increase the efficiency of shock absorbers of this character, particularly under different load conditions.

It is more particularly my object to provide a shock absorber which is inactive during a limited degree of movement between the members with which it is associated, but which imposes a progressively increasing resistance to relative movement between the members past said limits in either direction. A still further object resides in the provision of a shock absorber which is automatically adjustable to procure the foregoing operation under the different conditions of load in an automobile or other vehicle.

With the above and other objects and advantages in view, which will be apparent as the description proceeds, my invention resides in the novel features of construction, combination and arrangement of the parts as hereinafter described and defined by the appended claims.

Figure 1:
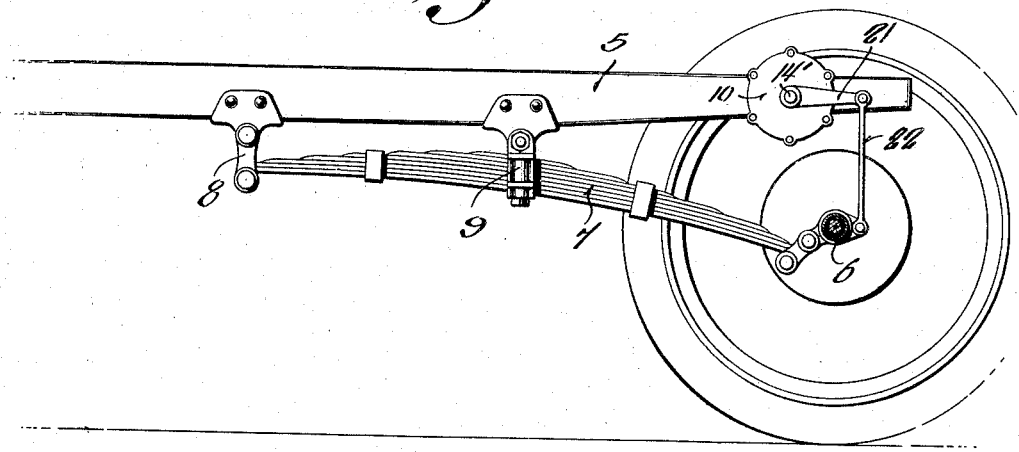
Figure 1 is a side elevational view of my improved shock absorber associated with the axle and frame portions of an automobile.
Figure 2:
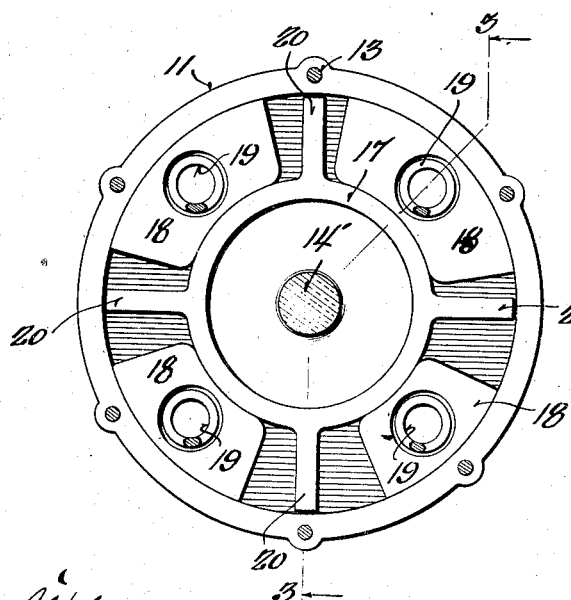
Fig. 2 is a vertical sectional view through the shock absorber on a plane indicated in general by the line 2—2 of Fig. 3, the annulus or hub member of the device being shown in elevation.
Figure 3:
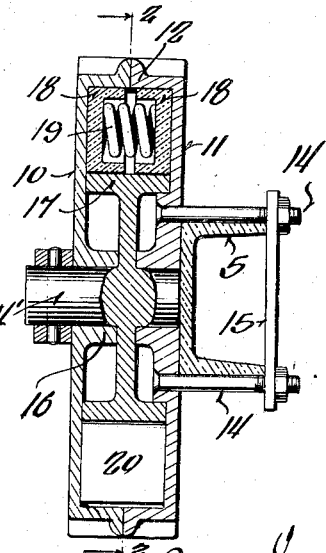
Fig. 3 is a transverse sectional view through the device on a plane indicated in general by the line 3—3 of Fig. 2.

Referring now more particularly to the accompanying drawings, 5 designates the chassis or frame of an automobile, and 6 designates one of the axles, which is connected primarily with the frame by a cantaliver spring 7, in the present instance, having one end secured to the axle and having its other end secured at 8 to the frame, the intermediate portion of the spring being connected with the frame by a swinging shackle 9.

In the present embodiment of my invention, my improved shock absorber is carried by one of the sills of the frame 5 and includes a pair of circular casing plates 10 and 11 having inturned peripheral flange portions 12 meeting to provide an annular wall for the casing, said sections being secured together by bolts 13 passed through enlargements of the flanges. The casing 11 fits against the frame sill and is secured thereto by bolts 14 extending from the plate at the top and bottom of the sill, and passed through a clamp plate 15 at the inner side of the sill. The central portions of the casing plates are provided with inwardly extending bearing sleeves 16 in which is mounted a shaft 14' carrying an annulus 17. A series of yieldable resistance units are confined in the space between this annulus and the peripheral wall of the casing. Each of these resistance units comprises a pair of blocks 18 longitudinally curved on their inner and outer faces to correspond to the curvature of the casing wall and annulus, the sides of the blocks being engageable with the inner faces of the casing plates 10 and 11 and resiliently urged thereagainst by a strong expansile spring 19 disposed in opposed sockets of the blocks. The tension of the spring 19 thus determines the degree of frictional resistance afforded by the respective resistance unit. The resistances of the units may be independently varied by providing springs having different tensions. The pairs of blocks of the various resistance units are of progressively different lengths. An abutment arm 20 extends from the annulus 17 between each pair of resistance units, these arms, however, being equally spaced about the periphery of the annulus. Thus, progressively varied spaces are provided between the abutment arms and the resistance units. The shaft 14 and its annulus 17 are connected with the vehicle axle 6 by a normally horizontal crank arm 21 on the shaft and a link 22 pivoted to the crank arm and to the axle.

In operation of the device, rocking movement of the crank arm due to relative movement between the axle 6 and vehicle frame will procure engagement of one of the abutment arms 20 with the resistance unit having the longest friction blocks and said blocks will be shifted in the casing to impart a yielding resistance. Should this movement be continued, a second abutment arm will engage the next resistance unit to provide an increased resistance and this may continue until all of the resistance units are engaged, thus providing a progressively increased resistance, and this action is set up upon movement of the axle either toward or away from the vehicle frame. It is noted that the greatest length of the friction blocks 18 is less than the space between an adjacent pair of abutment arms 20. Thus a certain degree of free movement of the blocks is permitted in either direction without setting up any resistance, and this arrangement provides a desired freedom of movement under the slight normal variations of spring tension. Inasmuch as the resistance units are free in the casing, the shock absorber automatically adjusts itself for normal operating conditions under varying loads which would of course procure different normal distances between the axle and vehicle body. This automatic adjustment is procured by an initial shifting of the friction blocks to meet the load.

While I have shown a preferred embodiment of my invention it will be appreciated that various reversals of operative parts or other changes or modification in structure may be employed to meet differing conditions of use or manufacture without departing in any manner from the spirit of my invention.

While I have shown and described the friction blocks 18 as being of progressively increased lengths, with the abutment arms 20 equally spaced apart it is obvious that the same general results may be procured by providing the friction blocks all of equal length and progressively increasing the spaces between the abutment arms.

I claim:

1. A shock absorbing device comprising the combination with a pair of relatively movable members of a series of resistance units each mounted for relative movement with respect to said members to set up frictional resistance upon such relative movement of the units and a member fixedly secured to one of said relatively movable members and having portions adapted for successive engagements with said resistance units upon continuous relative movement between said first named members.

2. A shock absorbing device comprising the combination with a pair of relatively movable members of an actuating member fixedly secured to one of said relatively movable members, a series of relatively movable resistance units arranged along the path of movement of said actuating member and adapted to procure frictional resistance upon movement of said units and abutment arms on said actuating member extending between pairs of adjacent resistance units adapted for successive engagements with the resistance units upon continued relative movement between said first named members.

3. A shock absorbing device comprising the combination with a pair of relatively movable members of an actuating member fixedly secured to one of said relatively movable members, a slideway extending along the path of movement of said actuating member, a series of resistance units frictionally mounted in said slideway and abutment arms on the actuating member disposed between pairs of adjacent resistance units and successively engageable therewith upon continued relative movement between said first named members.

4. A shock absorbing device comprising the combination with a pair of relatively movable members of an actuating member fixedly secured to one of said relatively movable members, a slideway extending along the path of movement of said actuating member, a series of resistance units frictionally mounted in said slideway, said resistance units being of progressively different lengths and abutment arms extending from equally spaced portions of the actuating member, said arms being engaged between pairs of adjacent resistance units whereby to successively engage said units upon continued movement of the actuating member.

5. A shock absorbing device comprising a casing having flat side walls and an annular wall, a shaft rotatable in the center of the casing, a concentric annulus integral with said shaft, a series of arcuate resistance units in the casing between the annulus and the annular wall of the casing, said units being frictionally engaged with the flat walls of the casing, and radial abutment arms extending from the annulus between the resistance units.

6. A shock absorbing device comprising a casing having flat side walls and an annular wall, a shaft rotatable in the center of the casing, a concentric annulus integral with said shaft, pairs of arcuate friction blocks in the casing between the annulus and the annular wall of the casing, the blocks of each pair being equal and opposed to each other, means for resiliently urging the blocks of each pair away from each other against the flat side walls of the casing and radial abutment arms extending from the annulus between each pair of blocks and the adjacent pairs.

In testimony that I claim the foregoing I have hereunto set my hand at Manitowoc, in the county of Manitowoc and State of Wisconsin.

WILLIAM M. BOENNING.